United States Patent [19]

Stölben

[11] Patent Number: 4,565,008
[45] Date of Patent: Jan. 21, 1986

[54] RELATIVE-DISTANCE PICKUP

[75] Inventor: Hans-Adolf Stölben, Erlangen, Fed. Rep. of Germany

[73] Assignee: Kraftwerk Union Aktiengesellschaft, Mulheim, Fed. Rep. of Germany

[21] Appl. No.: 590,688

[22] Filed: Mar. 19, 1984

[30] Foreign Application Priority Data

Mar. 24, 1983 [DE] Fed. Rep. of Germany ....... 3310788

[51] Int. Cl.$^4$ .............................................. G01B 7/02
[52] U.S. Cl. ............................... 33/172 E; 33/DIG. 1;
73/1 J
[58] Field of Search ....................... 33/172 E, DIG. 1;
73/1 J

[56] References Cited

U.S. PATENT DOCUMENTS 2,976,613  3/1961  Shields ............................ 33/DIG. 1
3,210,852  10/1965  Herndon ........................... 33/172 E
3,434,086  3/1969  Houpt et al. ....................... 33/172 E
4,490,913  1/1985  Vis .................................... 33/172 E

FOREIGN PATENT DOCUMENTS 1548266  1/1970  Fed. Rep. of Germany .... 33/172 E

Primary Examiner—Richard R. Stearns
Attorney, Agent, or Firm—Herbert L. Lerner; Laurence A. Greenberg

[57] ABSTRACT

A relative-distance pickup, includes a housing, a spring disposed in the housing, a feeler tip disposed in the housing and movable in longitudinal direction of the housing against the spring, an indicating device for registering relative motion of the feeler tip with respect to the housing, the feeler tip being subdivided transversely to the longitudinal direction of the housing forming first and second feeler tip parts, the second part having a stop, the first part being connected to the indicating device and the first part having a remote control drive for moving the first part against the stop.

3 Claims, 1 Drawing Figure

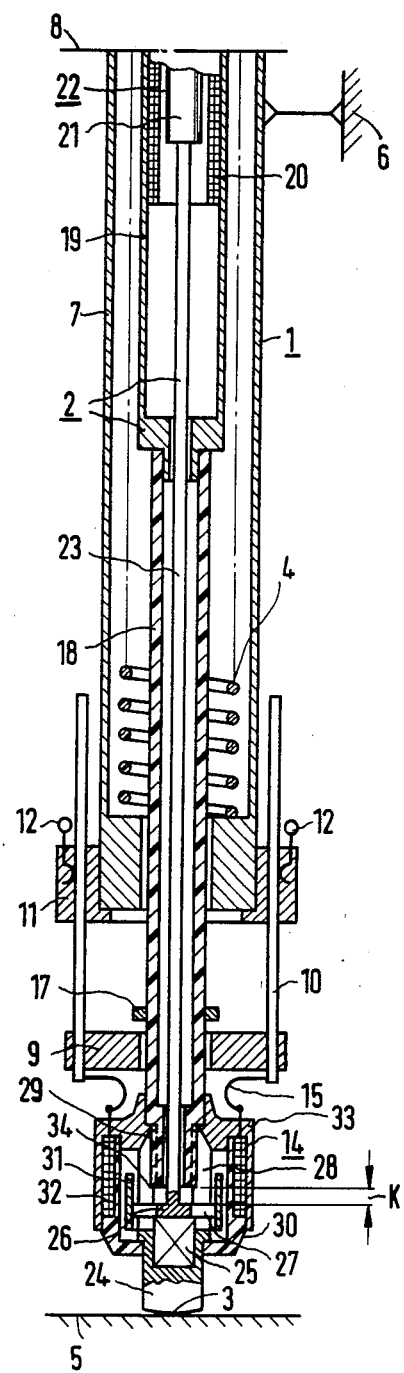

RELATIVE-DISTANCE PICKUP

The invention relates to a relative-distance pickup with a housing, in which a feeler tip is supported in such a way as to be longitudinally movable against a spring and the feeler tip is connected to an indicating device which registers relative movements of the feeler tip with respect to the housing.

Movements between two points are determined with such a relative-distance pickup. One point is defined by a rigid connection with the housing, and the other point is defined by the contact of the feeler tip. This structure is particularly useful with components and piping systems of nuclear power plants which are to be monitored during operation for vibrations relative to their foundations and abutments. In the monitoring process, the current measurement signals of the indicating device, particularly the inductance changes of a coil in which an armature moves, are evaluated by a comparison with reference signals or characteristic reference functions. Thus, incipient damage can be detected at an early stage from changes in the vibration behavior of the components or pipelines. However, the monitoring necessitates extremely high long-term stability of the pickups used and measuring chains which can only be guaranteed with difficulty under rough operating conditions, particularly because of radiation, heat and inaccessibility.

It is accordingly an object of the invention to provide a relative-distance pickup which overcomes the hereinafore-mentioned disadvantages of the heretofore-known devices of this general type, so that possible errors or drifts can be indicated and if necessary, corrected. For this reason, the invention seeks a simple solution to the problem of calibrating the pickup including the measuring chain, by remote control.

With the foregoing and other objects in view there is provided, in accordance with the invention, a relative-distance pickup, comprising a housing, a spring disposed in the housing, a feeler tip disposed in the housing and movable in longitudinal direction of the housing against the spring, an indicating device for registering relative motion of the feeler tip with respect to the housing, the feeler tip being subdivided transversely to the longitudinal direction of the housing forming first and second feeler tip parts, the second part having a stop, the first part being connected to the indicating device and the first part having a remote control drive for moving the first part against the stop.

The subdivision of the feeler tip and the remotely controlled drive associated therewith, permits an adjustment capability to be obtained, which actuates the indicating device by an amount defined by the stop. The size of this defined motion determines the accuracy of the desired calibration and specifically, the accuracy of the pickup including the measuring chain which is connected thereto and is required for the measurement. The size of the defined motion should therefore be as large as possible as compared to the motion to be measured; preferably several times the average measuring motion. Otherwise, the calibration is not limited to indication by an induction coil as mentioned above, but can also be used for other possible methods of indication, such as for capacitive distance pickup or a direct movement of an indicating or writing stylus.

In accordance with another feature of the invention, there is provided a permanent magnet coupling the first and second parts of the feeler tip to each other. In normal operation, the permanent magnet then provides the cohesion necessary for measurement, with a defined position between the part of the feeler tip facing away from the indicating device and the indicating device itself, when the indicating device also includes a measurement transducer associated with the feeler tip. However, the above-mentioned coupling can also be obtained in other ways, such as by a spring ratchet.

In accordance with a further feature of the invention, the remote control drive is an electromagnet having a coil connected to the second part and an armature connected to the first part of the feeler tip being moved by the coil. Other drives that can be used include pneumatically or hydraulically operated pistons.

In accordance with a concomitant feature of the invention, the second part of the feeler tip includes another stop and a cable support point connected to the coil, the cable support point being movable on the housing by the other stops. This permits the feeler tip to execute large travel distances without having to provide flexible lines for these distances which may be mechanically sensitive. In other words, part of the travel distance of the coil is bridged by the movably disposed contact, while the contact need not be moved for small motions which make up the "working signal" of the relative-distance pickup.

Other features which are considered as characteristic for the invention are set forth in the appended claims.

Although the invention is illustrated and described herein as embodied in a relative-distance pickup, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying sole figure of the drawing which is a simplified, diagrammatic, longitudinal-sectional view of a practically rotation-symmetrical relative-distance pickup, essential for the invention.

Referring now to the FIGURE of the drawing in detail, it is seen that a relative-distance pickup 1 is fastened in such a way that a feeler tip 2 thereof rests with its forward or leading side 3 against a measurement object 5 under the action of a spring 4. The measurement object 5 may be a steam generator of a pressurized-water reactor. The relative motion of the steam generator against the foundation 6 of the reactor building, to which the relative-distance pickup is fastened, is to be determined and monitored.

The part of the relative-distance pickup 1 which is connected to the foundation 6 and is stationary, so to speak, includes a tubular housing 7 with a diameter of 25 mm, which is broken off in the figure at reference numeral 8. The housing 7 encloses the above-mentioned spring 4 and carries a cable support 9 on the side thereof facing the measurement object 5. The cable support point 9 is movably mounted by electrically conducting rods 10 at a contact ring 11. Thus, a sliding contact is established as one part of an electrical connection from contact terminals 12 to a feeler tip head 14 which is connected by short, flexible leads 15 to the rods 10 and contact runs 16 associated therewith. The cable support point 9 is disposed between the feeler tip head 14 and a stop 17 in such a way that, while it is taken along in case of large movements that are caused particularly by thermal expansion and may amount to 40 mm, for instance, it need not be touched for normal excursions of the measurement object 5 of less than 0.2 mm.

The feeler tip head 14 is mounted on a plunger 18 which is connected to a tube section 19 in the housing 7. The tube section 19 serves for guiding the spring 4 and extends over an induction coil 20 which is stationarily disposed in the housing 7. A pickup core 21 moves within the coil 20. The coil 20 and the core 21 form an inductive measuring transducer 22 as an indicating device for relative movements of the feeler tip head 14. To this end, the pickup core 21 is connected to the feeler tip head 14 by a rod 23 enclosed by the plunger 18, so that the rod 23 forms a first part of the feeler tip 2 while the head 14 forms a second part thereof.

In the position shown in the FIGURE, the rod 23 is directly connected to a feeler pin 24, which is formed of hardened steel. A permanent magnet 25 is carried in the feeler pin 24. The rod 23 has a plate 26 at the end thereof facing away from the pickup core 21, against which the magnet 25 rests. The plate 26 acts as an armature, so that a holding force of 5 N is produced.

The plate 26 is mounted in the interior of the feeler tip head 14, which is closed off by a cap 30. In the feeler tip head 14, the plate 26 carries a tubular armature 31 with three lateral extensions in the form of arms 27. The armature 31 is associated with a coil 32 which is inserted into a coil form 33 mounted at the free end of the plunger 18. In order to secure the coil form 33, the feeler pin 24 is screwed with a needle nipple 28 that is slotted for the arms 27, onto an end 29 of the plunger 18 which is provided with a thread.

The free end 29 of the plunger 18 forms a stop 34 for the plate 26 of the rod 23. This provides play for a relative motion between the rod 23 and the plunger 18 with the feeler tip head 14, which is used for calibrating the indicating transducer 22. The calibration motion is accomplished by remote control if the coil 32 is energized and moves the rod 23 with the pickup core 21 through its armature 31, as a mechanical drive.

In the embodiment shown, a calibration travel distance K of 1 mm is seen. This is at least 5-times the travel of 0.2 mm required for operational measurements, so that a high accuracy of the calibration is achieved. The movement of the pickup core 21 is possible at any time and without access to the relative-distance pickup 1. Furthermore, the recording of the relative travel distance to be determined is also practically unchanged by the calibration travel "K", because the determination of the relative travel distance with the feeler tip head 14 is preserved. Only the relative position of the rod 23 of the feeler tip 2 (associated with the indicating device 22) is changed over the distance K relative to the other part with the feeler tip head 14 and the plunger 18.

The connection with a sliding contact shown in the FIGURE also permits the pick up of extremely large thermal expansions which may be in the order of 40 mm in measurements dealing with nuclear power plants. This is done without the disadvantages of the flexible connections that are necessary therefor becoming mechanically sensitive or excessively increasing the weight of the parts determining the accuracy of the measurement. In this connection it should be noted that the mass of the feeler tip shown as an example is only 15 g, in spite of the calibrating capability, so that small vibrations with frequencies up to several hundred Hz are also properly recorded with the calibration according to the invention.

I claim:

1. Relative-distance pickup, comprising a measuring device including: a housing, a feeler tip disposed in said housing and movable in longitudinal direction of said housing, an indicating device connected to said feeler tip for registering relative motion of said feeler tip with respect to said housing, said feeler tip being subdivided forming first and second feeler tip parts, a remote control drive moving said first and second parts relative to each other between first and second end positions for adjustment of said indicating device, a permanent magnet coupling said first and second parts with each other in said first end position, and a stop holding said first and second parts adjacent each other in said second end position.

2. Relative-distance pickup according to claim 1, wherein said remote control drive is an electromagnet having a coil connected to said second part and an armature connected to said first part of said feeler tip being moved by said coil.

3. Relative-distance pickup according to claim 2, wherein said second part of said feeler tip includes another stop and a cable support point connected to said coil, said cable support point being movable on said housing by said other stop.

* * * * *